United States Patent [19]
Beroth

[11] Patent Number: 5,509,722
[45] Date of Patent: Apr. 23, 1996

[54] CONVERTIBLE PASSENGER SEAT ASSEMBLY AND GROUPING OF PASSENGER SEAT ASSEMBLIES

[75] Inventor: Michael T. Beroth, Lewisville, N.C.

[73] Assignee: Burns Aerospace Corporation, Winston-Salem, N.C.

[21] Appl. No.: 228,284

[22] Filed: Apr. 15, 1994

[51] Int. Cl.⁶ ................................................. B64D 11/06
[52] U.S. Cl. .................. 297/452.40; 297/232; 244/118.6
[58] Field of Search .................................. 297/232, 248, 297/452.40; 244/118.6, 122 R

[56] References Cited

U.S. PATENT DOCUMENTS

| | | | |
|---|---|---|---|
| 3,893,729 | 7/1975 | Sherman et al. | 297/232 X |
| 4,881,702 | 11/1989 | Slettebak | 244/118.6 |
| 5,104,065 | 4/1992 | Daharsh et al. | 244/118.6 |
| 5,131,607 | 7/1992 | Arnold et al. | 244/118.6 |
| 5,178,345 | 1/1993 | Peltola et al. | 244/118.6 |
| 5,284,439 | 2/1994 | Arnold et al. | 297/232 X |

Primary Examiner—Peter R. Brown
Attorney, Agent, or Firm—W. Thad Adams, III

[57] ABSTRACT

A passenger seat assembly convertible between a first two-seat configuration, and a second two-seat configuration having increased seating space between seat armrests and spacing between seats. The seat assembly includes a seat assembly base with first and second seats mounted on the seat assembly base for carrying respective seat bottom and seat back cushions. The first seat is slidably mounted on the seat assembly base. The first seat includes first and second armrest assemblies positioned on opposite sides of the first seat. The second seat mounted in fixed relation on the seat assembly base, the second seat having a third armrest assembly positioned in fixed relation on the side of the second seat opposite the second armrest assembly of the first seat. The first armrest assembly is mounted in slidable relation to both the first seat and the second seat. The second armrest assembly is mounted in slidable relation to the first seat and in fixed relation to the second seat. Therefore, the second seat and the second armrest assembly are moveable in unison between the first seat configuration wherein the first and second seats and the first, second and third armrest assemblies are relatively close together and the second seat configuration wherein the first and second seats and the first, second and third armrest assemblies are each further apart to provide increased spacing between seat armrests and spacing between seats. Locking means are provided for locking the seat assembly into either its first or second seat configuration.

4 Claims, 10 Drawing Sheets

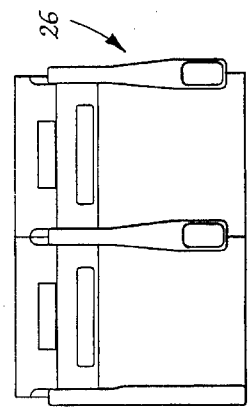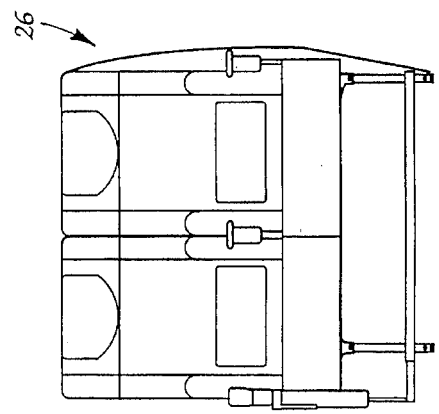
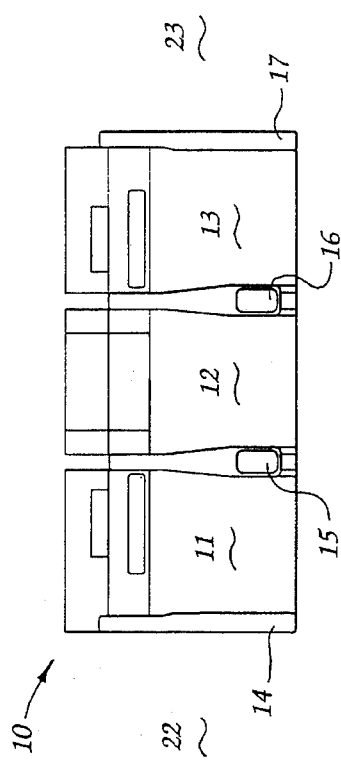
Fig. 2a
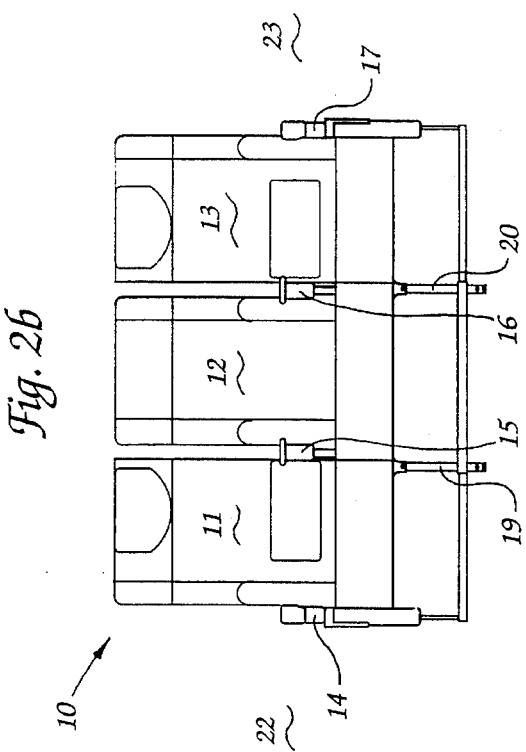
Fig. 2b
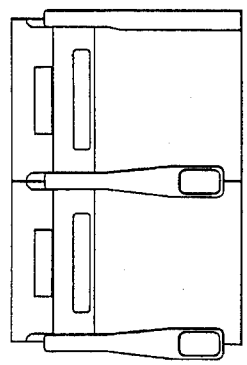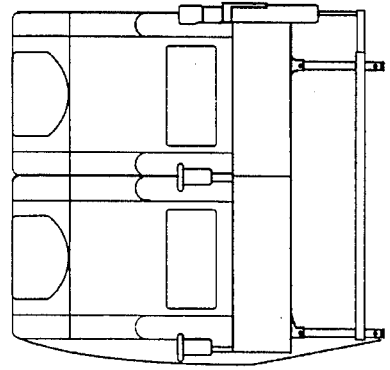

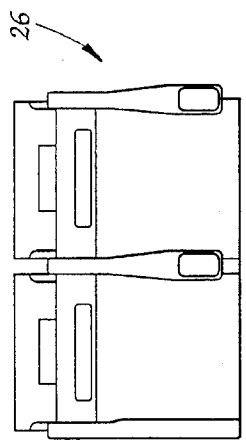
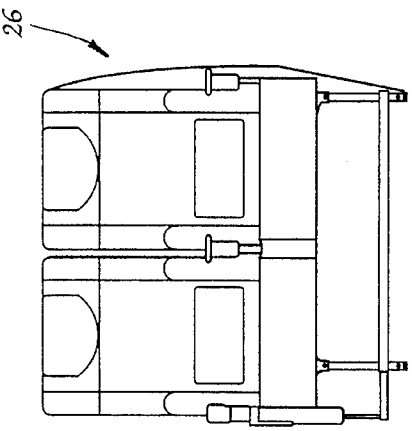
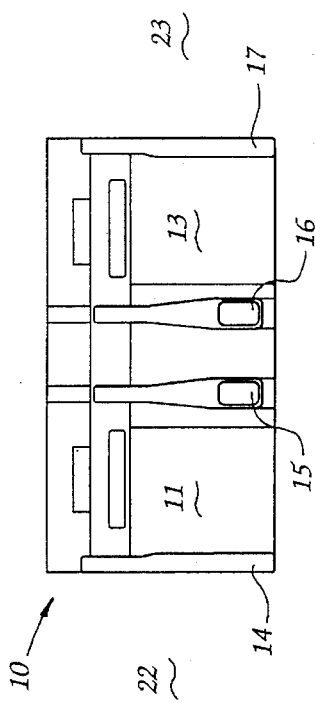
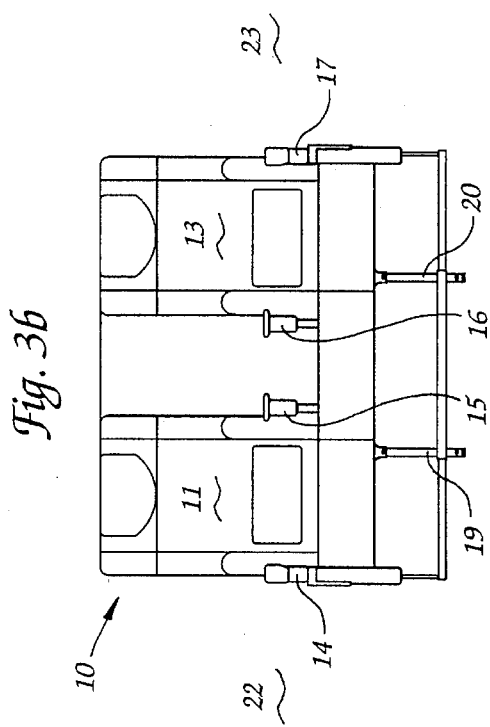
Fig. 3a    Fig. 3b
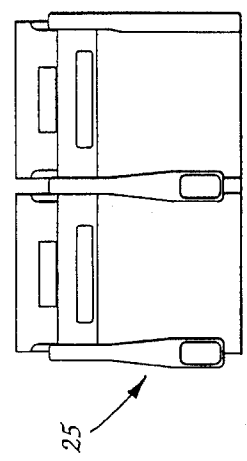
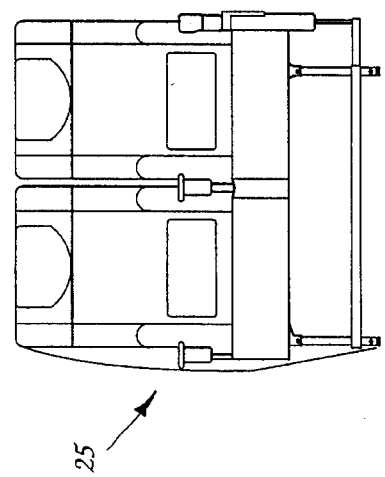

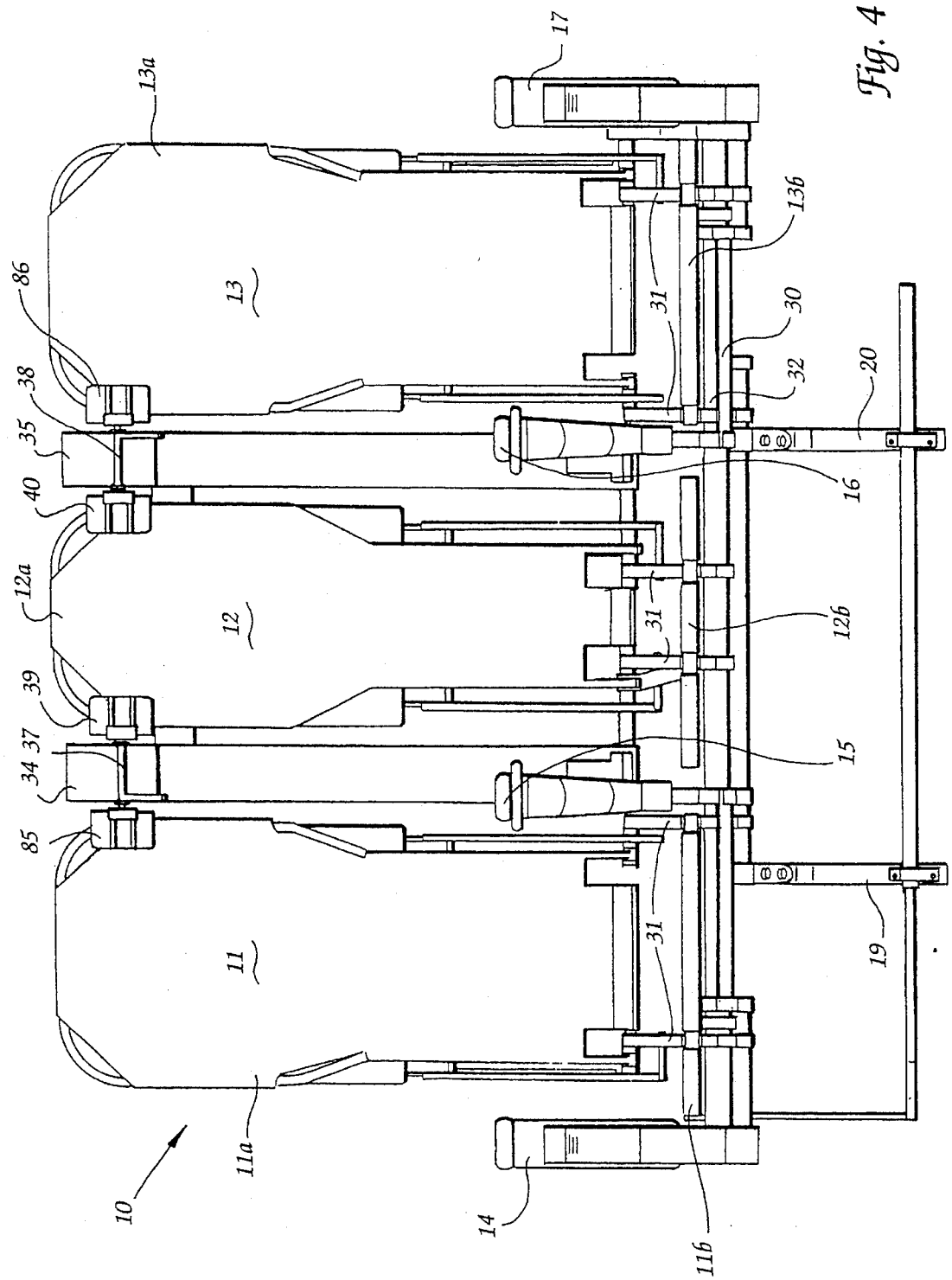

CONVERTIBLE PASSENGER SEAT ASSEMBLY AND GROUPING OF PASSENGER SEAT ASSEMBLIES

TECHNICAL FIELD AND BACKGROUND OF THE INVENTION

This invention relates to a passenger seat assembly, such as for use in a commercial aircraft, which is convertible between a first two-seat and a second two-seat configuration. This type of convertibility permits airlines to quickly change the seat configuration to more closely match passenger mix and schedule changes. Changes in the airline industry have made quick turnaround time between flights of increasing importance. Because of financial losses, many airlines have cancelled or delayed new aircraft orders. Existing aircraft must be more quickly turned around between flights. In situations where seat configuration changes are needed, the ability to convert a seat between a two-seat configuration such as used in an economy-class cabin and a relatively wider two-seat configuration saves substantial time over replacement of an entire seat assembly, which generally requires the aircraft to be out of service at least overnight, and to be serviced by ground staff personnel.

Conventional aircraft seat assemblies are generally formed of two or more seats attached to a unifying frame which is in turn locked into a seating track in the floor of the aircraft. These seats are usually fixed onto the frame in such a way as to prevent adjustments to the width of the seat itself or to the spacing between adjacent seats on the assembly.

U.S. Pat. Nos. 5,178,345; 5,131,607; 5,104,065 and 4,881,702, all owned by the Boeing Company, disclose convertible seats, some of which alter the seat configuration between two and three seats, and others of which convert seats between different widths of two and three-seat assemblies.

The convertible seat assembly disclosed in this application permits quick and simple conversion between differing-width two-seat assemblies, and between two and three seat assemblies in a passenger seat grouping by flight personnel between flights. In the embodiment below, a seat row grouping of two, two-seat assemblies and a single, center, three-seat assembly is disclosed. Numerous other combinations are possible within the scope of the invention.

SUMMARY OF THE INVENTION

Therefore, it is an object of the invention to provide a passenger seat convertible between first and second two-seat configurations.

It is another object of the invention to provide a passenger seat which permits quick conversion of economy seats to business-class seats.

It is another object of the invention to provide a passenger seat which is convertible between first and second two-seat configurations from one side of the seat.

It is another object of the invention to provide a passenger seat which permits expansion and compression of the passenger seat assembly in such a way as to alter both the seating width and the space between seats in a single, linear movement of the seat assembly.

These and other objects of the present invention are achieved in the preferred embodiments disclosed below by providing a passenger seat assembly convertible between a first two-seat configuration, and a second two-seat configuration having increased seating space between seat armrests and spacing between seats. The seat assembly includes a seat assembly base with first and second seats mounted on the seat assembly base for carrying respective seat bottom and seat back cushions. The first seat is slidably mounted on the seat assembly base. The first seat includes first and second armrest assemblies positioned on opposite sides of the first seat. The second seat mounted in fixed relation on the seat assembly base, the second seat having a third armrest assembly positioned in fixed relation on the side of the second seat opposite the second armrest assembly of the first seat. The first armrest assembly is mounted in slidable relation to both the first seat and the second seat. The second armrest assembly is mounted in slidable relation to the first seat and in fixed relation to the second seat. Therefore, the second seat and the second armrest assembly are moveable in unison between the first seat configuration wherein the first and second seats and the first, second and third armrest assemblies are relatively close together and the second seat configuration wherein the first and second seats and the first, second and third armrest assemblies are each further apart to provide increased spacing between seat armrests and spacing between seats. Locking means are provided for locking the seat assembly into either its first or second seat configuration.

According to one preferred embodiment of the invention, the seat assembly base includes fore and aft seat mounting tubes, and the first seat includes fore and aft slide brackets slidably mounted on the respective fore and aft seat mounting tubes.

According to another preferred embodiment of the invention, the seat assembly base includes fore and aft armrest assembly mounting tubes, and the first armrest assembly includes fore and aft slide brackets slidably mounted on the respective fore and aft armrest mounting tubes.

According to yet another preferred embodiment of the invention, the locking means includes a key mounted on the first armrest assembly and having first and second locking positions and keyway means in the seat assembly base with the key positioned therein. The first locking position of the key in the keyway locks the seat assembly in the first two-seat configuration and the second locking position of the key in the keyway locks the seat assembly in the second two-seat configuration.

According to a preferred embodiment of the invention, a grouping of seat assemblies, such as a single row of seats, includes an aircraft passenger seat grouping formed of a plurality of passenger seat assemblies aligned in a row from the port to the starboard side of a passenger compartment in an aircraft and convertible between a first seat configuration, and a second seat configuration having relatively increased seat spacing, wider seats, and a fewer number of seats. The grouping comprises a port-side seat assembly having a first window and a second aisle seat, a center seat assembly having a third and fourth aisle seats separated by a fifth center seat, and a starboard-side seat assembly having a sixth window and a seventh aisle seat. Seat assembly expansion means are provided for increasing the spacing between seats and the seating width provided by each of the seats. Seat assembly compression means are provided for reducing the overall length of the center seat assembly and for reducing the width of the fifth center seat and thereby converting it from a seat to a dead zone between the third and fourth aisle seats of the seat grouping.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 2A is a schematic top plan view of a single row of seating assemblies forming a single row grouping of seats in a passenger aircraft, the center seat assembly being in an economy configuration;

FIG. 2B is a schematic front elevation of the single row of seating assemblies in FIG. 2A;

FIG. 3A is a schematic top plan view of a single row of seating assemblies in a passenger aircraft forming a single row grouping of seats, the center seat assembly being in a two-seat configuration;

FIG. 3B is a schematic front elevation of the single row of seating assemblies in FIG. 3A;

FIG. 4 is a front elevation of the seat frame of the seat assembly shown in FIGS. 2A and 2B;

DESCRIPTION OF THE PREFERRED EMBODIMENT AND BEST MODE

General Description of Seat Assembly 10

Figure 1:
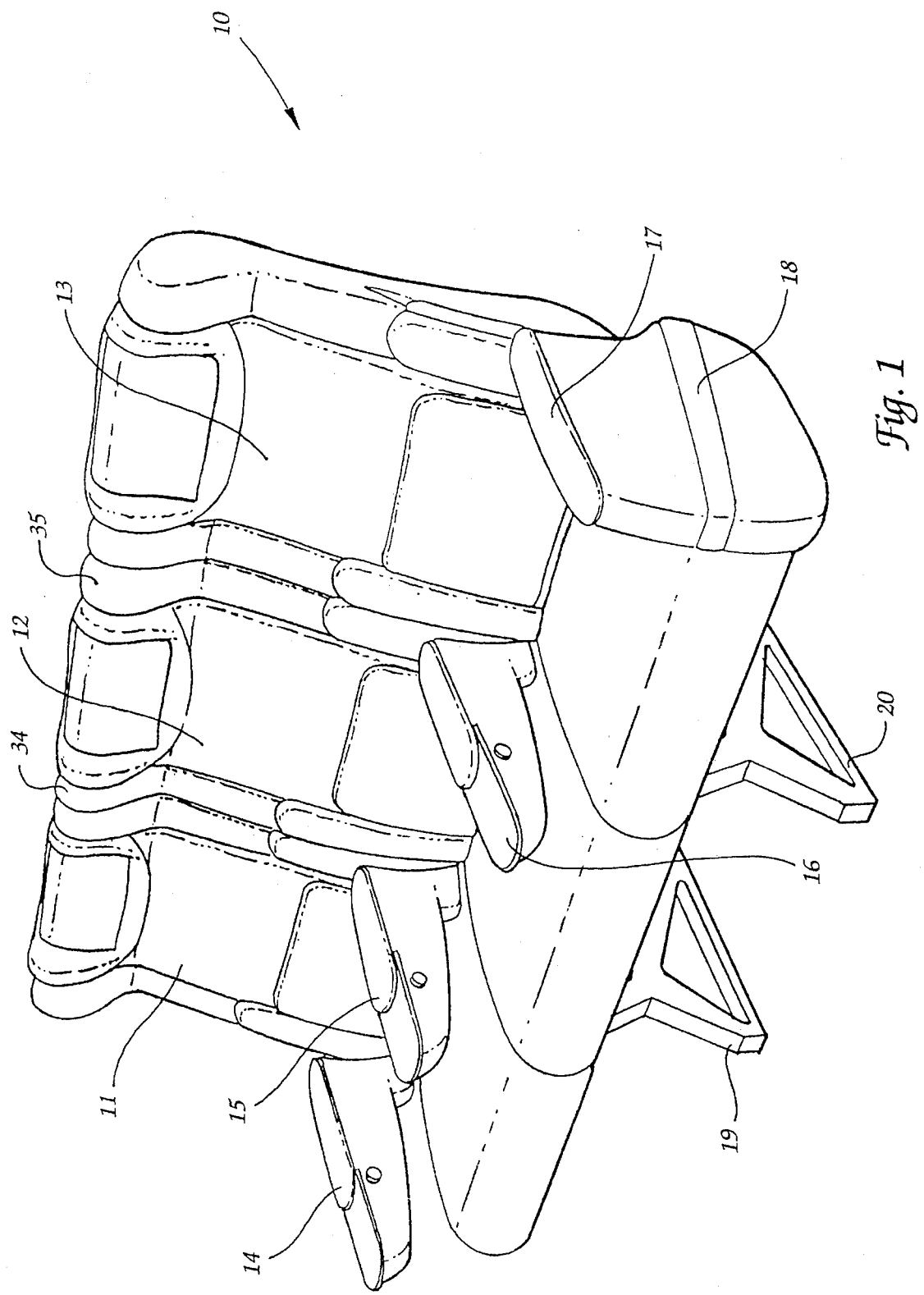
FIG. 1 is a perspective view of a passenger seat assembly in a three-seat economy configuration in accordance with an embodiment of the invention.

Referring now specifically to the drawings, a passenger seat assembly according to one embodiment of the present invention is illustrated in FIG. 1 and shown generally at reference numeral 10. The seat assembly 10 is used in combination with seat assemblies 25 and 26, shown in FIGS. 2A, 2B, 3A, 3B, 8, 9A–C, 10 and 11 to form a novel seat grouping shown in FIGS. 2A, 2B, 3A and 3B. The particular seat assembly shown in FIG. 1 is adapted for being positioned next to a window in the fuselage of the aircraft, and includes a window seat 11, center seat 12 and an aisle seat 13. In the economy configuration shown in FIG. 1, seat assembly 10 includes four armrests 14, 15, 16 and 17. Armrest 14 is positioned next to the window and armrest 17 with its full panel end bay 18 is positioned next to the aisle. Armrests 15 and 16 are shared by the three occupants.

The three seats 11, 12 and 13, and supporting frames, are mounted on legs 19 and 20 which are in turn locked into tracks (not shown) in the floor of the aircraft. When used in the center of an aircraft with aisles on both ends, both ends would have end bays such as end bay 18 in FIG. 1. Since the seat assembly 10 is otherwise identical, the seat assembly, whether used on the side or in the center of the aircraft will be referred to as "seat assembly 10".

General Description of Seat Grouping and Seat Assemblies 25 and 26

Referring now to FIG. 2A and 2B, a complete row of seat assemblies is shown. In the configuration shown, seat assembly 10 is positioned in the center of the row separated by aisles 22 and 23, with seat assemblies 25 and 26—each with two seats—positioned on the port and starboard sides of the aircraft. By way of example only, the row is particularly configured for a Boeing 767 aircraft. FIGS. 2A and 2B show the economy configuration having a total of seven seats across the row from one side to the other.

In the 767 configuration shown in FIGS. 2A and 2B, each of the seat assemblies 25 and 26 are 42 inches wide and provide 18 inches of seat space between armrests. Aisles 22 and 23 are each 18.53 inches wide between armrests. While seats 25 and 26 are also convertible between configurations to provide more seat room, the method of conversion is different than that of the seat assembly 10 which is the subject of this application. Thus, while seats 25 and 26 will be generally referred to in their two configurations, the manner of making the conversion will not be further detailed in this application.

Seat assembly 10 according to this particular example in the three-seat configuration of FIGS. 2A and 2B is 62 inches wide, provides 18 inches of seat space between armrests, two inches of clearance between adjacent seat backs and four inches of clearance between adjacent seat bottoms at the outer end.

When conversion from a three-seat to a two seat configuration is made, the purpose is to provide greater seat room and increased space between adjacent seats. Referring now to FIGS. 3A and 3B, a two seat configuration for seat assembly 10 such as would be used for a business class seating section is shown.

Seat assembly 10 according to this particular example in the two seat configuration is 54 inches wide, provides 19 inches of seat space between armrests 14 and 15 and 19 inches between armrests 16 and 17, 12 inches of clearance between adjacent seat backs and 14 inches of clearance between adjacent seat bottoms at the outer end. This 12 inch seat back clearance and 14 inch seat bottom clearance, previously part of seat 12, forms a "dead zone" between adjacent passengers, and also provides a separate armrest 15 or 16 for each of the two passengers. Thus, the overall width of the seat assembly 10 has been decreased from 62 to 54 inches.

Seat assemblies 25 and 26 have been increased in overall width from 42 to 44 inches. The direct result of this conversion is to provide a seat width of 19 inches rather than 18 inches, and to provide four inches between adjacent seats. With seats 25 and 26 in this configuration and seat assembly 10 compressed to provide two larger seats 11 and 13, the row has been quickly converted from an economy to a business-class row. Conversion of the desired number of rows as described above provides a business-class cabin.

Detailed Description of Seat Assembly 10

Referring now to FIG. 4, a seat assembly 10 with cushions removed is shown and more specifically described. Seat backs 11A, 12A and 13A are mounted to a rear seat frame tube 30 by brackets 31, as are seat bottoms 11B, 12B and 13C. The front end of seat bottoms 11B, 12B and 13C are supported on a front seat frame tube 32.

Positioned between seat backs 11A and 12A, and 12A and 13A are auxiliary seat backs 34 and 35, respectively. In the three-seat configuration shown in FIGS. 1 and 4, the auxiliary seat backs 34 and 35 act as the seat back edges for the center seat 12, and are used by the occupant of the center seat 12. Note particularly in FIG. 1 that the auxiliary seat backs 34 and 35 are the same shape along their length as the adjacent sides of the seats 11 and 13, and are flush with the adjacent surfaces of seats 11 and 13.

Auxiliary seat backs 34 and 35 include respective locking bars 37 and 38 which cooperate with locking plates 39 and 40 on the upper outside edges of seat back 12A to hold the three structures together while in the three-seat configuration shown in FIG. 4.

Figure 5:
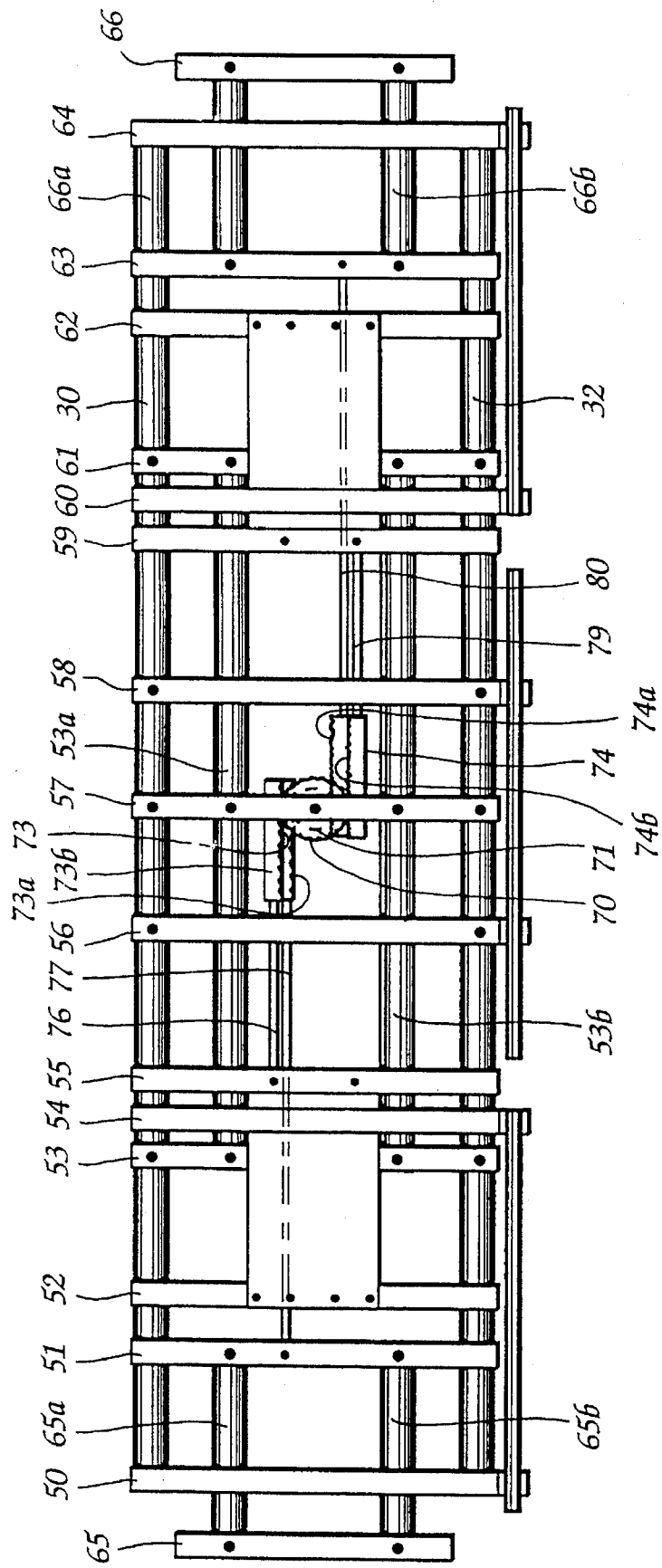
FIG. 5 is a simplified top plan view of the drive means of the seat assembly in the expanded, three-seat configuration.

Referring now to FIG. 5, the drive mechanism for moving the seat assembly 10 back and forth between the configurations shown in FIGS. 2A, 2B and 3A, 3B is shown. In the position shown in FIG. 5, the seat 10 is in the position shown in FIGS. 1, 2A, 2B and 4.

Front and rear seat frame tubes 32, 30 form major support structures for the drive mechanism, with brackets 50–64 extending between front and rear seat frame tubes 32, 30 to tie them together and to provide support for moving structures. Brackets 53, 56, 57, 58 and 61 are fixed on front and rear seat frame tubes 32, 30. Brackets 50, 51, 52, 54, 55, 59, 60, 62 and 63 include slide bearing rings by which they are mounted on the tubes 32, 30 and slide as the seat 10 movement takes place. Brackets 53 and 61 are interconnected by slide tubes 53A, 53B, which extend through holes in brackets 54, 55, 56, 57, 58, 59 and 60. The "dots" in the above-referenced brackets identify securing points wherein the identified brackets are immovably fixed to one or more of the tubes, as noted.

End bay support brackets 65 and 66 on opposite ends of the seat assembly are attached to the armrests 14 and 17. Bracket 65 extends through holes in bracket 50 and connects to bracket 51 and moves therewith. Bracket 66 extends through holes in bracket 64 and connects to bracket 63 and moves therewith.

A pair of concentric pinion gears 70, 71 are mounted for rotation on a vertical axis on bracket 57. Gears 70 and 71 have a ratio of 5-to-4, meaning that rotation of gear 70 sufficient to create straight-line movement of 5 inches will cause sufficient rotation of gear 71 to create straight-line movement of 4 inches. A pair of racks 73 and 74 engage the teeth of gears 70 and 71. Rack 73 has two sets of rack teeth 73A, 73B which engage gears 71, 70, respectively. Rack 73 is attached to a pair of rack arms 76, 77. The other end of rack arm 76 is attached to bracket 55, on which armrest 15 is mounted. The other end of rack arm 77 is attached to bracket 51, which is connected by end bay slide tubes 65A, 65B to bracket 65 on which armrest 14 is mounted.

Rack 74 also has two sets of rack teeth—74A, 74B—which engage gears 71, 70, respectively. Rack 74 is attached to a pair of rack arms 79, 80. The other end of rack arm 79 is attached to bracket 59, on which armrest 16 is mounted. The other end of rack arm 80 is attached to bracket 63, which is connected by end bay slide tubes 66A, 66B to bracket 66 on which armrest 17 is mounted.

Figure 6:
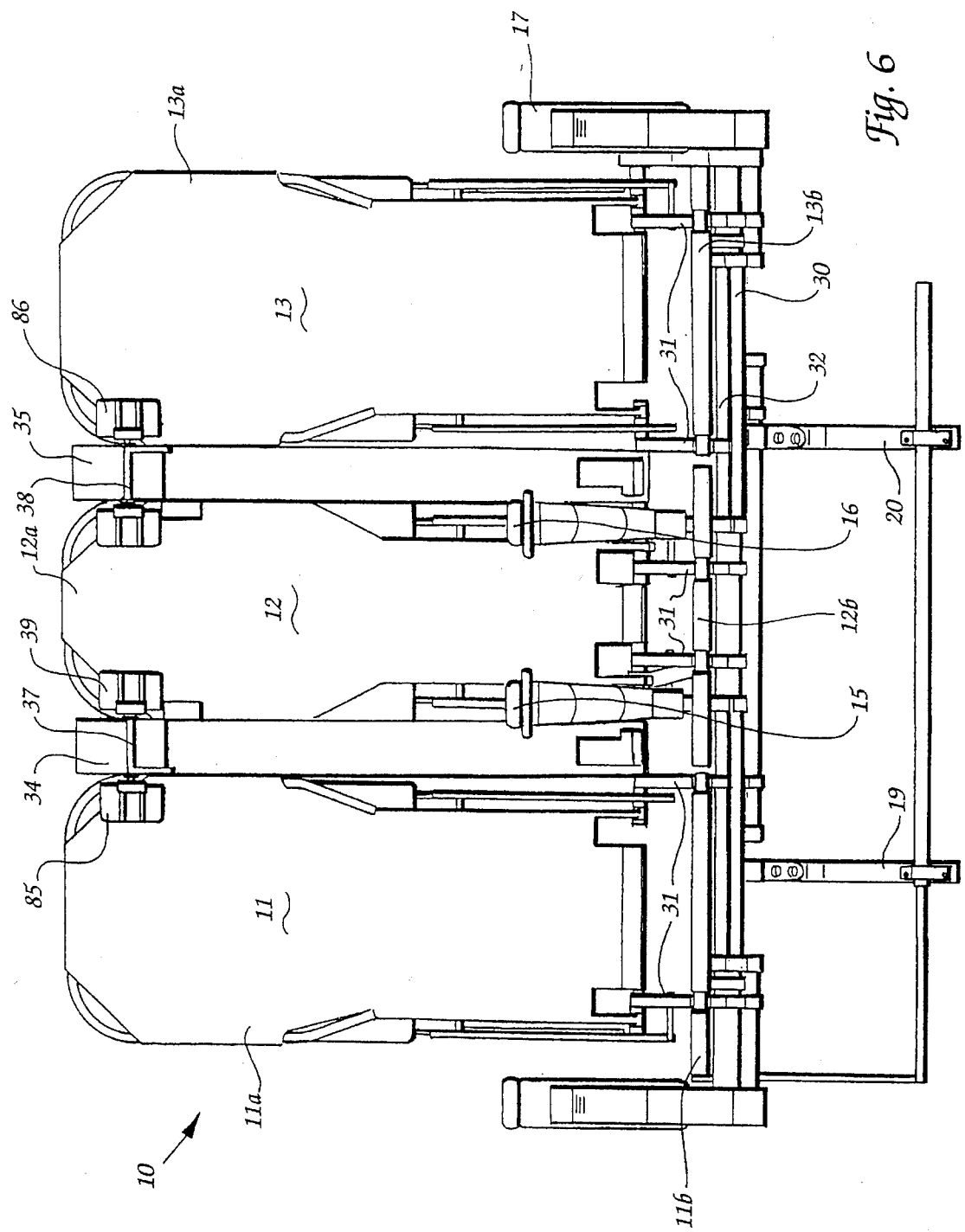
FIG. 6 is a front elevation of the seat frame of the seat assembly shown in FIGS. 3A and 3B.

Referring now to FIGS. 3A, 3B, and 6, seat assembly 10 in its two-seat configuration is shown. With particular reference to FIGS. 3A, 3B, note that the overall width of the seat assembly 10 is reduced eight inches—from 62 to 54 inches. This reduction takes place by a four inch inward movement of each of the opposite end bays with armrests 14 and 17. Also note that the inside armrests 15 and 16 are now eight inches apart instead of 18 inches apart, as in FIGS. 2A, 2B. This results from an inward movement of five inches inwardly of each of the armrests 15 and 16, or a total of ten inches. The four inch inward movement of the armrests 14 and 17 removes four inches from the seat width of each of the seats 11 and 13. The five inch inward movement of each of the armrests 15 and 16 adds five inches to the width of each of the seats 11 and 13. Thus, instead of the seats 11 and 13 providing 18 inches of seating width between the armrests 15 and 16, as in the three-seat configuration, a 19 inch seating with is provided. In addition, an eight inch "dead zone" is provided between armrests 15 and 16 to provide greater spacing between adjacent passengers.

The manner in which this translational movement of the seat assembly 10 takes place is described below:

Locking bars 37 and 38 are removed from locking plates 39 and 40, thus releasing auxiliary seat backs 34 and 35 from connection with the center seat 12. Locking bars 37 and 38 are then engaged with locking plates 85, 86 on the inner sides of seats 11 and 13, respectively to lock together the auxiliary seat 34 to seat 11 and the auxiliary seat 35 to seat 13. Then, either armrest 14 or 17 is pushed inwardly.

Figure 7:
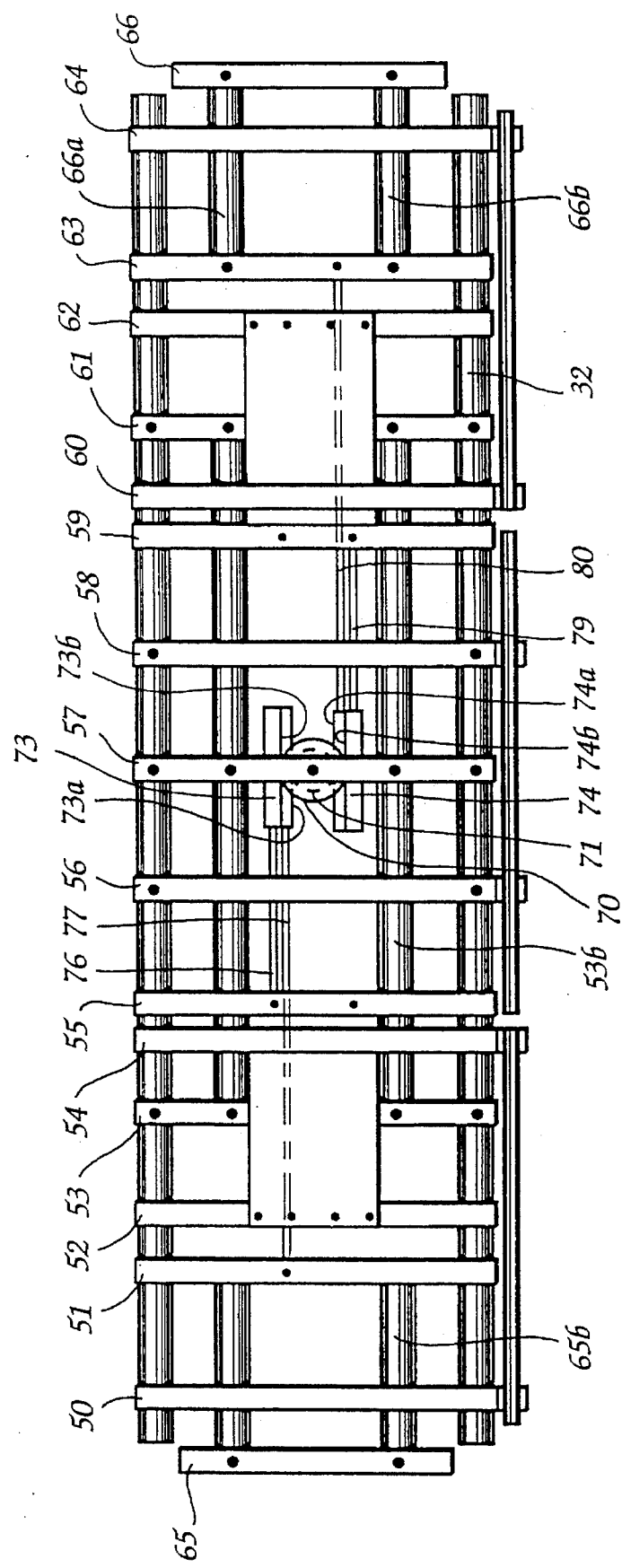
FIG. 7 is a simplified top plan view of the drive means of the seat assembly in the expanded, three-seat configuration.

Referring now to FIGS. 5 and 7, inward movement of the bracket 65 on which armrest 14 is mounted causes bracket 51 to slide along tubes 30 and 32. The rack arm 77 pushes rack 73 inwardly, and the rack teeth 73A drive gear 71 clockwise. Gear 70 is locked to gear 71 and rotates as well. Rotation of gear 70 drives rack teeth 73B and moves the rack arm 76 inwardly, as well. As described above, rotation of gears 71 sufficient to create four inches of straight-line movement causes a straight-line movement of five inches through gear 70, moving bracket 55 inwardly five inches.

Rotation of gears 70, 71 also drives rack 74, pulling brackets 63 and 66 inwardly four inches, and bracket 59 inwardly five inches. Since armrest 16 is mounted on bracket 59, it moves inwardly five inches. Armrest 17 is mounted on bracket 66 and thus moves inwardly four inches.

As is clear from the foregoing, either bracket 65 or 66 can be the driving or the driven end of the seat assembly 10, the movement of the gears 70, 71 transmitting the motion uniformly to both sides of the seat assembly 10.

Thus, as described above, the brackets 65, 66 and thus armrests 14 and 17 move inwardly four inches, while brackets 55 and 59 move armrests 15 and 16 inwardly five inches. The resulting seat configuration is shown in FIGS. 3A, 3B, 6 and 7.

The auxiliary seat backs 34 and 35, and corresponding portions of the seat bottoms become the innermost part of seats 11 and 13, while the outermost portions of seats 11 and 13 reside behind armrests 14 and 17, respectively. To return the seat assembly 10 to a three-seat configuration, the above procedure is carried out in reverse.

Detailed Description of Seating Assemblies 25 and 26

Figure 8:
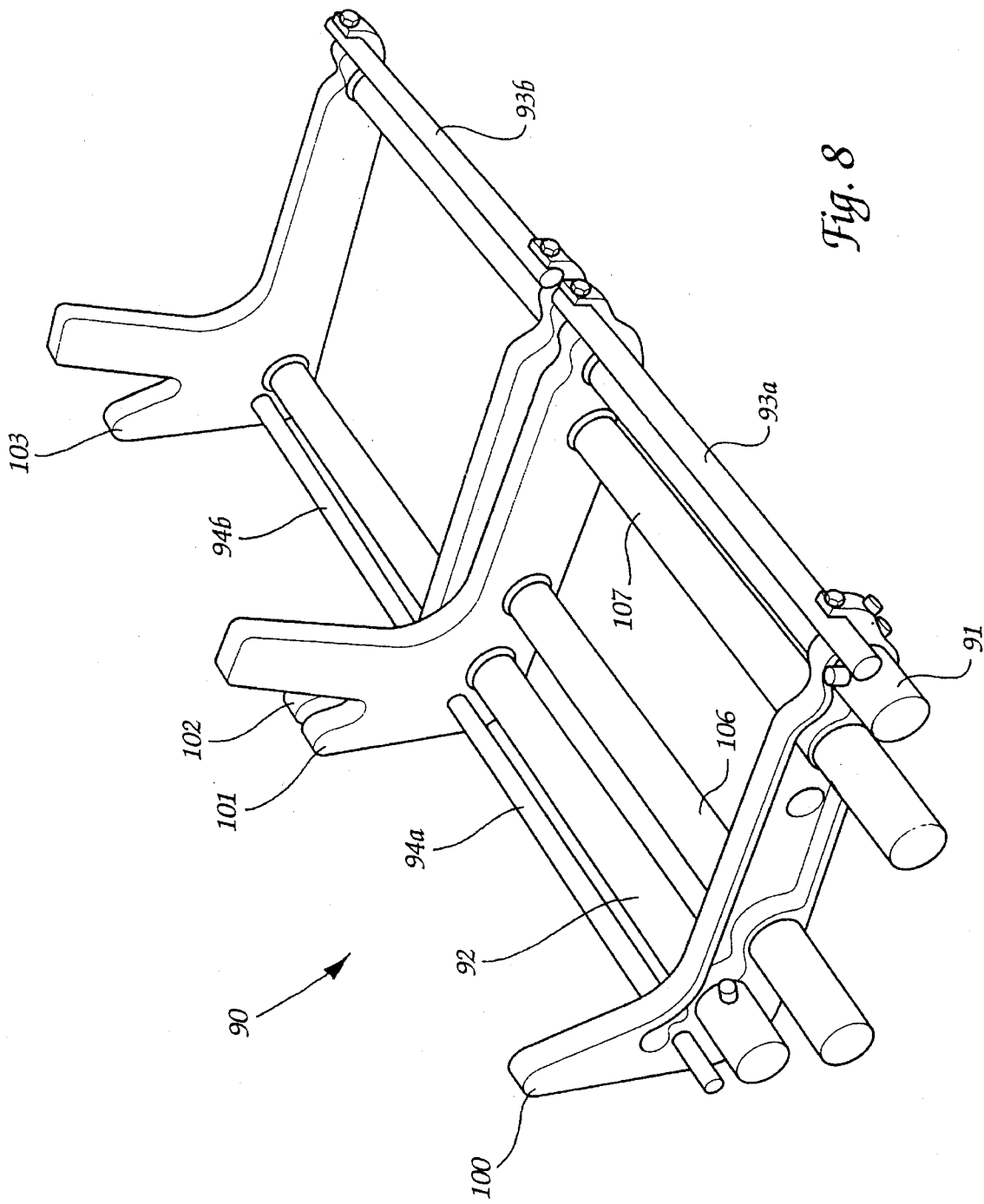
FIG. 8 is a perspective view of the seat frame of the two-seat assembly.
Figure 9A:
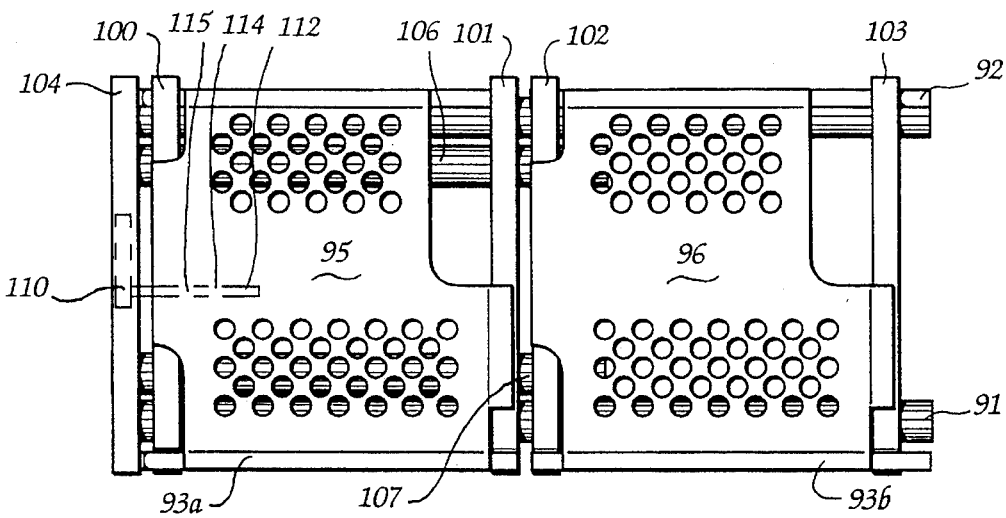
FIG. 9A is a top plan view of the seat frame in FIG. 8 in a relatively narrow, economy-type configuration.
Figure 9B:
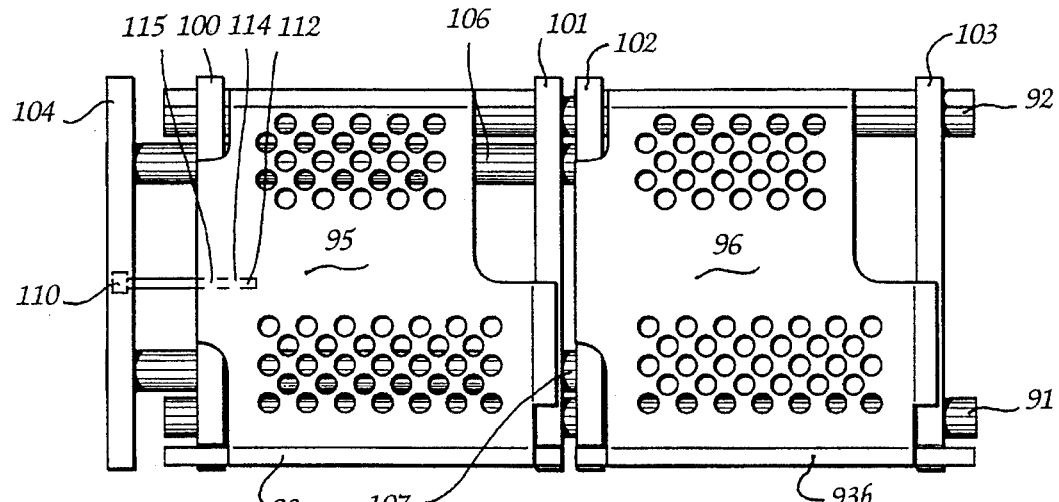
FIG. 9B is a top plan view of the seat frame in FIG. 8 in an intermediate position during conversion from the narrow, economy class-type configuration to the wider, business class-type configuration.
Figure 9C:
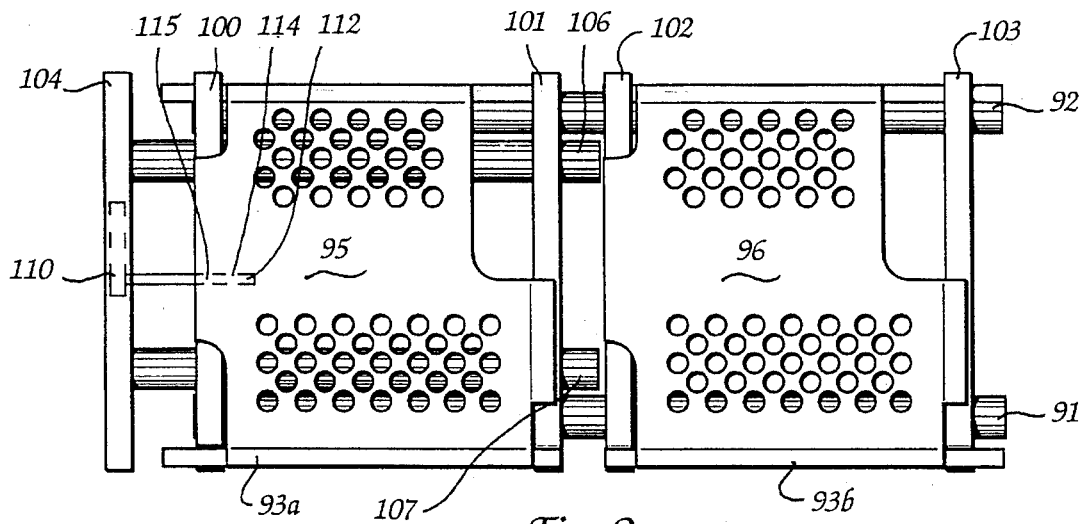
FIG. 9C is a top plan view of the seat frame in FIG. 8 in a relatively wider, business class-type configuration.

Referring now to FIG. 8, the seat assembly base 90 of seats 25 and 26 is shown. The armrest support normally positioned on the near end of seat assembly base 90 has been removed for clarity. Seat assembly base 90 includes front and rear seat mounting tubes 91, 92 and a pair of front and rear seat bottom support tubes 93A, 93B and 94A, 94B. Perforated seat bottom support plates 95 and 96 are fastened to front and rear seat bottom support tubes 93A, 94B and 94A, 94B, as is shown in FIGS. 9A, 9B and 9C. The seat bottom support plates 95 and 96 represent the individual passenger seats in a fully-assembled seat assembly 25 or 26. Front and rear seat mounting tubes 91, 92 are positioned in holes formed in seat frame brackets 100, 101, 102 and 103.

As is best shown in FIGS. 9A, 9B, 9C, an end bay bracket 104, which supports an armrest, is mounted on the end of armrest assembly mounting tubes 106, 107. Seat frame brackets 100, 101 are slide brackets and are slidably positioned on seat mounting tubes 91, 92 and armrest assembly mounting tubes 106, 107 for limited sliding movement. Armrests are mounted on seat brackets 101 and 103.

By continued reference to FIGS. 9A, 9B, 9C, conversion of seat assembly 25 is explained. FIG. 9A illustrates the position of the seat support plates 95 and 96. In this position the adjacent seats are 18 inches wide between armrests, with 2 inches between adjacent seat backs and an overall seat assembly width of 42 inches. See FIGS. 2A and 2B. This is a standard economy class seat configuration.

Conversion of this seat configuration to a wider configuration suitable for a business class cabin involves a single step having two consecutive component movements. End bay bracket 104 is pulled into the aisle a total of two inches. This increases the overall width of the seat assembly 25 or 26 from 42 inches to 44 inches. The first component of the movement is illustrated in FIG. 9B. As can be seen, the end bay bracket 104 has moved outwardly while the seat support plate 95 has remained stationary. This motion increases the effective seat width of the seat positioned on seat support plate 95 between armrests from 18 to 19 inches. See FIG. 3A, 3B. This movement occurs by reason of the armrest assembly mounting tubes 106, 107 sliding through the brackets 100, 101 during this motion.

A stop, not shown, on the armrest assembly mounting tubes 106, 107 arrests movement of the end bay bracket 104 relative to the brackets 100, 101 after one inch of movement. Thereafter, end bay bracket 104 moves one inch further out into the aisle, carrying with it the brackets 100, 101, and thus the seat support plate 95, as is shown in FIG. 9C. This motion increases the seat width of the seat supported on the seat support plate 96 from 18 to 19 inches, while maintaining the distance between the adjacent seats at two inches. This two component movement therefore increases each of the seat widths between armrests by one inch consistent with the increase of seat width between armrests of the center seat assembly 10. Thus, the business class grouping has six seats across a single row, each of which is 19 inches wide between armrests. See FIGS. 3A, 3B.

Figure 10:
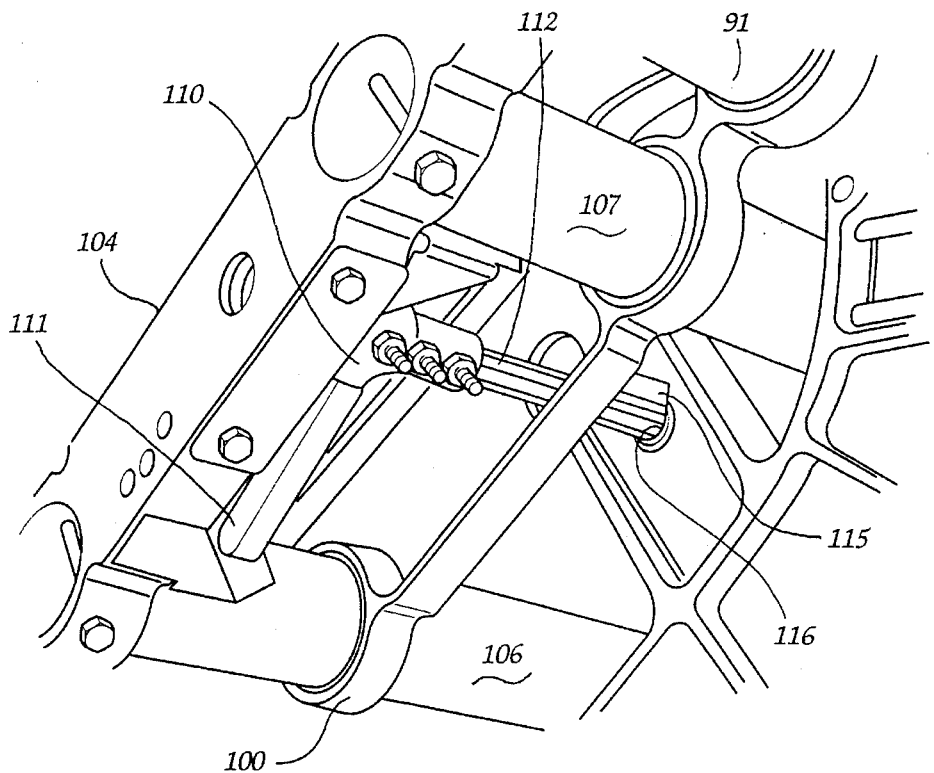
FIG. 10 is a fragmentary perspective view of the locking device of the seat assembly shown in FIGS. 8–9C.
Figure 11:
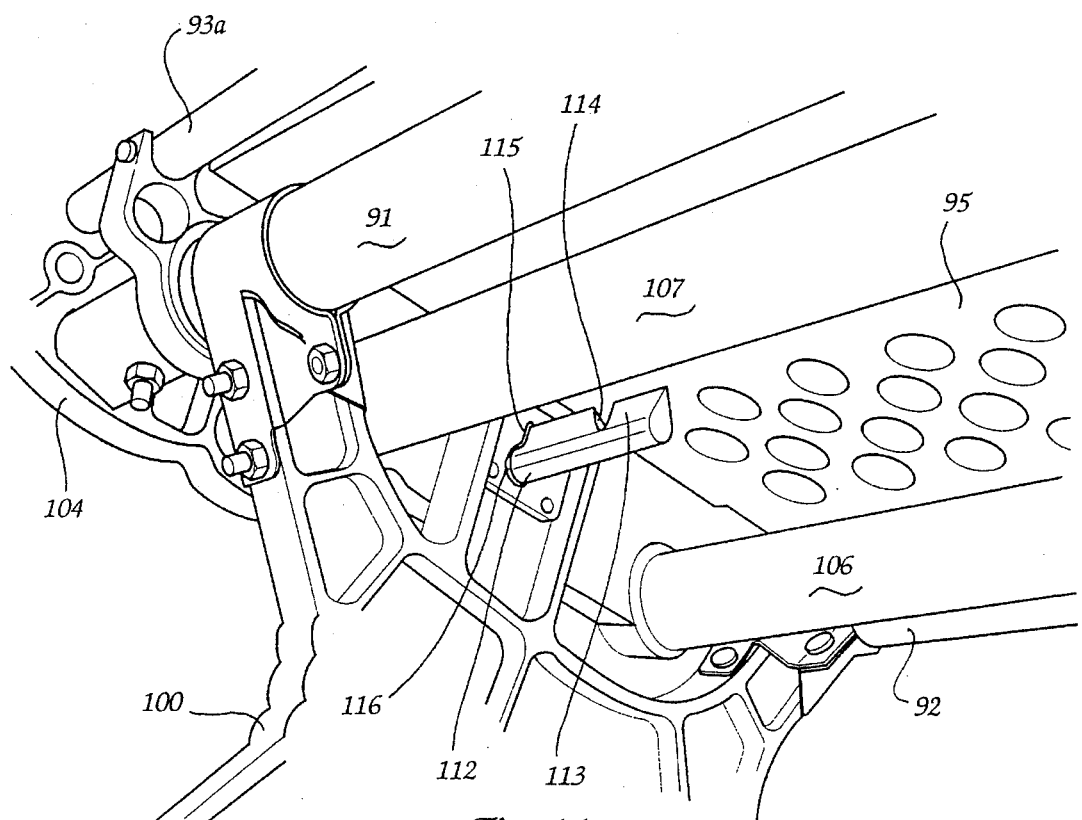
FIG. 11 is a another fragmentary perspective view of the locking device of the seat assembly shown in FIGS. 8–9C.

Referring now to FIGS. 10 and 11, a locking device for locking the seat 25 or 26 into each of the two-described positions is illustrated. FIGS. 10 and 11 are views from underneath the seat assembly base 90, with the end bay bracket 104 shown. A spring-loaded key 110 is positioned under the end bay bracket 104. Key 110 has a handle 111 which can be gripped with the hand and turned. A key blade 112 is attached to the handle 111 and is mounted on the end bay bracket 104 for movement therewith. Key blade 112, as is best shown in FIG. 11, includes a radially-extending wedge-shaped flange 113 with two spaced-apart notches 114 and 115. These two notches 114 and 115 are two inches apart—a distance corresponding to the total distance which seat 25 will move during the change in configuration described above. A keyhole 116 is formed in bracket 100. The outline shape of the keyhole 116 matches the outline shape of the key blade 112 and 113 so that when aligned, the key 110 will move through the keyhole 116. The key 110 will assume a locked position only when either the notch 114 or 115 is aligned with the keyhole 116. Then, the spring-loading permits the key 110 to turn. Once turned, the key 110 will not move either in or out, thus locking seat 25 into one of its two positions.

In the position shown in FIGS. 10 and 11, seat 25 is in its narrow, economy-type configuration. To reconfigure the seat 25, the handle 111 of the key 110 is grasped and turned until the flange 113 is aligned with the keyhole 116. Then, the handle 111 is used to pull the seat 25 into its wider configuration, as described above. Since the notches 114 and 115 are two inches apart, the seat 25 will not lock into its wider configuration until the full two inch movement of the end bay bracket 104 has been completed. This motion repositions the key 110 with notch 114 in alignment with the keyhole 116, allowing the key 110 to turn and the notch 114 to lock the key 110 and thus the attached end bay bracket and seat 25 into position.

To return the seat 25 to its narrower configuration, the process is reversed, and the key 110 is used to push the end bay bracket 104 inwardly until alignment between keyhole 116 and notch 115 permits the key 110 to turn into its locked position.

A convertible passenger seat assembly and a grouping of passenger seat assemblies is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A passenger seat assembly convertible between a first two-seat configuration, and a second two-seat configuration having increased seating space between seat armrests and spacing between seats, comprising:

(a) a seat assembly base;

(b) first and second seats mounted on said seat assembly base for carrying respective seat bottom and seat back cushions;

(c) said first seat being slidably mounted on seat slide means on said seat assembly base for lateral movement, said first seat including first and second armrest assemblies mounted on opposite lateral sides of said first seat;

(d) said second seat being mounted in fixed relation on said seat assembly base, said second seat having a third armrest assembly positioned in fixed relation on the side of said second seat opposite the second armrest assembly of said first seat;

(e) said first armrest assembly mounted on first armrest slide means in laterally slidable relation to both said first seat bottom cushion and said second seat;

(f) said second armrest assembly mounted on second armrest slide means in laterally slidable relation to said second seat and in fixed relation to said first seat bottom cushion;

(g) whereby said first seat and said second armrest assembly are moveable in unison between:

(1) said first seat configuration wherein said first and second seats and the first, second and third armrest assemblies are relatively close together;

(2) said second seat configuration wherein said first and second seats and the first, second and third armrest assemblies are each further apart to provide increased spacing between seat armrests and spacing between seats; and (h) locking means carried by said base and selectively engaging said seat slide means for locking the seat assembly into either its first or second seat configuration.

2. A passenger seat assembly according to claim 1, wherein said seat assembly base includes fore and aft seat mounting tubes, and said first seat includes fore and aft slide brackets slidably mounted on said respective fore and aft seat mounting tubes.

3. A passenger seat assembly according to claim 1, wherein said seat assembly base includes fore and aft armrest assembly mounting tubes, and said first armrest assembly includes fore and aft slide brackets slidably mounted on said respective fore and aft armrest assembly mounting tubes.

4. A passenger seat assembly according to claim 1, wherein said locking means comprises:

(a) a key mounted on said first armrest assembly and having first and second locking positions;

(b) keyway means in said seat assembly base with said key positioned therein;

(c) the first locking position of said key in said keyway locking said seat assembly in said first two-seat configuration and said second locking position of said key in said keyway locking said seat assembly in said second two-seat configuration.

* * * * *